United States Patent
Wang et al.

(10) Patent No.: US 6,840,884 B2
(45) Date of Patent: Jan. 11, 2005

(54) FLUCTUATING GEAR RATIO LIMITED-SLIP DIFFERENTIAL

(76) Inventors: Xiaochun Wang, CNC Institute, School of Mechanical Engineering, Xi'an Jiao Tong University, Xi'an City, Shanxi Province (CN), 710049; Hong Jiang, CNC Institute, School of Mechanical Engineering, Xi'an Jiao Tong University, Xi'an City, Shanxi Province (CN), 710049

( * ) Notice: Subject to any disclaimer, the term of this patent is extended or adjusted under 35 U.S.C. 154(b) by 0 days.

(21) Appl. No.: 10/345,160

(22) Filed: Jan. 16, 2003

(65) Prior Publication Data

US 2003/0139244 A1 Jul. 24, 2003

Related U.S. Application Data

(63) Continuation-in-part of application No. PCT/CN02/00624, filed on Sep. 6, 2002.

(30) Foreign Application Priority Data

Nov. 14, 2001 (CN) .......................................... 01131791 A

(51) Int. Cl.[7] .............................................. F16H 48/06
(52) U.S. Cl. ........................................................ 475/230
(58) Field of Search ................................. 475/230, 236, 475/344, 904

(56) References Cited

U.S. PATENT DOCUMENTS

| | | | | |
|---|---|---|---|---|
| 1,528,762 A | * | 3/1925 | Goodhart | 475/236 |
| 1,586,861 A | * | 6/1926 | Taylor | 475/236 |
| 2,065,661 A | * | 12/1936 | Davis | 475/236 |
| 2,283,661 A | * | 5/1942 | Williamson | 475/236 |
| 2,692,515 A | * | 10/1954 | Scurlock | 475/236 |
| 2,827,803 A | * | 3/1958 | Peter | 475/236 |
| 4,244,243 A | * | 1/1981 | McCaw | 475/236 |
| 4,754,661 A | * | 7/1988 | Barnett | 475/236 |
| 6,063,000 A | | 5/2000 | Sugimoto | |
| 6,068,099 A | | 5/2000 | Chludek | |
| 6,325,738 B1 | | 12/2001 | Caringella et al. | |
| 6,398,686 B1 | | 6/2002 | Irwin | |
| 6,464,056 B1 | | 10/2002 | Lowell et al. | |

* cited by examiner

*Primary Examiner*—Dirk Wright
(74) *Attorney, Agent, or Firm*—Nixon & Vanderhye, P.C.

(57) ABSTRACT

A differential features larger amplitude in gear ratio fluctuation and higher torque bias ratio. When one of the driving wheel slips, the period of the gear ratio fluctuation between the pinion and side gears involves at least two pitches, thus each period of the gear ratio fluctuation involves a group of teeth, and the number of teeth involved in each group are corresponding to the number of pitches involved in each period. Each pinion has an odd number of groups of teeth, and the group number in side gears is a multiple of the number of pinions. The differential is particularly suitable for off-road vehicles, tippers and wheeled civil engineering machinery.

13 Claims, 4 Drawing Sheets

FLUCTUATING GEAR RATIO LIMITED-SLIP DIFFERENTIAL

This application is a continuation-in-part of application Serial No. PCT/CN02/00624 filed Sep. 6, 2002, the entire content of which is hereby incorporated by reference in this application.

BACKGROUND OF THE INVENTION

1. Field of the Invention

This invention relates to limited-slip differentials for wheeled vehicles, particularly relates to a type of fluctuating gear-ratio limited-slip differential.

2. Background of Related Art

Limited-slip differentials are well known and take different forms; the working principle can be divided into inner friction model, overrunning model, electronic controlled automatic differential locker, the limited slip function realized using ABS brake system, and potential barrier model. Each model has some defects.

For inner friction model, which is the most widely used model of limited slip differentials, can be subdivided into preloaded and non-preloaded, both have the defects of higher price, and the later may be even more expansive, while the former may leads to a higher steering resistance and increased tire wear.

The overrunning model has complicated structure, works roughly, and some types have a lower reliability.

The electronic automatic differential locker also works roughly, being complicated in structure.

The limited-slip function realized by ABS system consumes more power.

This patent reveals a type of limited-slip differential belonging to potential barrier model, having the advantage of simple structure, higher reliability and true traction. The function is realized by periodic change in gear ratio between the pinions and the side gears, and the pinions have an odd number of the gear ratio fluctuating period in one revolution, so that when the gear ratio between the pinions and one side gear reaches the maximum, the gear ratio between the pinions and the other side gear gets the minimum, thus an unequal distribution of the torque on two side gears is realized. If the pinions rotate an angle of a half period of the speed ratio fluctuation, the torque distribution on both side gears is interchanged. The periodic change in the torque bias ratio forms two potential barriers, if the ratio of the torque acted on side gears does not reach the maximum torque bias ratio, the differential cannot make a continuous differential rotation, thus the slip of the driving wheel is limited. But up to now for available product, the period of the speed ratio fluctuation is only one pitch. In each pitch the pinions and the side gears will undergo a process of relative angular acceleration and deceleration, the relative angular acceleration is rather higher, the value is proportional to the changing range in gear ratio, and proportional to the square of the number of speed ratio periods involved in one revolution of the pinions. A larger relative angular acceleration will lead to higher relative curvature between tooth surfaces and lower load capacity, tends to make noise. Although the fluctuating range in gear ratio can be improved to a certain extent by means of optimization, the effect is limited. A further increment in the range of gear ratio will lead to a rapid increment in relative curvature between tooth surfaces, or even generate an edge on tooth surfaces. According to traditional design method of one-pitch period, the maximum speed ratio resulted in differential movement between two side gears is only 1:1.38 for a gear pair of 7 teeth in a pinion and 12 teeth in a side gear; and the speed ratio is reduced to 1:1.31 for a gear pair of 9 teeth in pinion and 12 teeth in side gears, it is not sufficient for the requirement of off-road vehicles.

SUMMARY OF THE INVENTION

The object of the present invention is to provide a type of limited slip differential characterized by larger fluctuating range in gear ratio and higher torque bias ratio, which can greatly improve the cross-country ability when one of the driving wheels is running on icy-snow road surfaces.

To realize the object, the technical scheme of the present invention is a type of fluctuating gear-ratio limited-slip differential, by means of periodic fluctuation in the gear ratio between the planet and side gears, the torque distribution between two side gears becomes a periodic function of the angle of rotation of the planet gears, so that the slip on one side of the driving wheels is limited. The differential mainly comprises a differential case, a cross or straight pinion shaft fixed within the differential case, plural pinions, and a pair of side gears situated within the differential case engage with the pinion gears with fluctuated gear ratio, and the period of the gear ratio between the pinion and side gears involves at least two pitches, and the number of pitches involved in each period are corresponding to the common factor in the number of teeth in both pinion and side gears. Each period of the gear ratio fluctuation involves a group of teeth, and the number of teeth involved in each group are corresponding to the number of pitches involved in each period, the combined working range of the teeth involved in each group covers the whole working range of both the pinions and side gears involved in a period of gear ratio, and for each group of the same gear the corresponding teeth have the same structure.

The working range for each tooth in each group can be determined in design process, and there is a small overlap in working range between adjacent tooth pairs.

For preferred scheme of the invention, the number of pitches involved in each gear ratio period is 3, therefore the numbers of teeth in both pinion and side gears are multiples of 3. The adjacent three teeth involved in each group are successively a lower tooth, a higher tooth and another lower tooth with the same tooth height of the above lower one. Between a higher tooth and a lower tooth is a shallower tooth groove, and between two lower teeth is a deeper tooth groove.

For another preferred scheme of the invention, the three teeth involved in each group are successively a higher tooth, a lower tooth and another higher tooth with the same tooth height of the above higher one. Between a higher tooth and a lower tooth is a deeper tooth groove, and between two higher teeth is a shallower tooth groove.

The pinions have an odd number of tooth groups, so that when the gear ratio between the pinions and one side gear reaches the maximum, the gear ratio between the pinion and the other side gear reaches the minimum. The group number in side gears is a multiple of the number of planet gears, so that each pinion works at the same phase angle.

This said gear ratio is a function as follows:

$$\frac{d\phi^{(1)}}{d\phi^{(2)}} = \frac{z_2}{z_1}[1 - C \cdot \text{rat} \cdot \sin(z_2 \phi^{(2)}/3) + C \cdot (1 - \text{rat}) \cdot \sin(z_2 \cdot \phi^{(2)})]$$

where $z_1$ denotes the number of teeth in side gears, $z_2$ is the number of teeth in pinions, $\phi^{(1)}$ represents the angle of rotation of the side gear, while $\phi^{(2)}$ indicates the angle of rotation of the pinions, C denotes the amplitude of the fluctuation in gear ratio, while rat is the ratio between the first and the sum of the first and third order harmonic components of C. The range of the number of teeth $z_1$ in side gears is 9, 12, 15 and 18; while the range of the numbers of teeth in pinions $z_2$ is 9 and 15; the codomain of C is 0.2 to 0.4; while the codomain of rat is 0.7 to 1.0.

The lower part of the profiles of the bevel gear pair with fluctuating gear ratio, i.e. beneath the pitch line is some analytic curve, while the upper part, i.e.,. above the pitch line is a conjugate profile of the analytic curve profile of the tooth that matches with, which is determined point by point based on the theorem of engagement that the relative speed between the tooth surfaces is perpendicular to the normal of the analytic tooth profile at the point. When the conjugate profile is in contact with the analytic profile, the relative movement between the gear pair can meet the equation as follows:

$$\frac{d\phi^{(1)}}{d\phi^{(2)}} = \frac{z_2}{z_1}[1 - C \cdot \text{rat} \cdot \sin(z_2\phi^{(2)}/3) + C \cdot (1 - \text{rat}) \cdot \sin(z_2 \cdot \phi^{(2)})]$$

where $z_1$ denotes the number of teeth in side gears, $z_2$ is the number of teeth in pinions, $\phi^{(1)}$ represents the angle of rotation of the side gears, while $\phi^{(2)}$ indicates the angle of rotation of pinions, C denotes the amplitude of the fluctuation in gear ratio, while rat is the ratio between the first and the sum of the first and third order harmonic components of C. The codomain of C is from 0.2 to 0.4, while the codomain of rat is from 0.7 to 1.0. The range of the number of teeth $z_1$ in side gears is 9, 12, 15 and 18; while the range of the number of teeth in planet gear $z_2$ is 9 and 15. The analytic curve is a combination of straight line, circular and elliptical arcs, evolvente and logarithmic spiral. Since each pair of teeth in a group has an individual working range, each tooth in a group has its individual profile.

The principle of present invention is that the period of the gear ratio is increased to at least two pitches, thus in comparison to traditional design method, the number of the periods of the gear ratio fluctuation involved in one revolution of the pinion is reduced to one half or less, thus the speed ratio fluctuating range can be substantially increased while the relative angular acceleration between the pinion and side gears can be reduced at the same time.

In comparison with previous technologies, the distinguished advantages of the invention is described as follows:

The differential described in present patent is a type of fluctuating gear-ratio differential, the gear ratio fluctuates during the process of the engagement between the pinion and side gears, and the period of speed ratio fluctuation is increased to two pitches or higher, thus the speed ratio fluctuating range can be substantially increased while the relative angular acceleration between the pinions and side gears can be reduced at the same time.

For preferred embodiments, the present invention is a type of three-pitch fluctuating transmission-ratio differential, the gear ratio fluctuates during the process of the engagement between the pinion and side gears, and the period of speed ratio fluctuation is three pitches. Since the speed ratio fluctuation period is increased to three pitches, the relative angular acceleration between the pinions and side gears is greatly reduced, and the phenomenon of forming an edge on tooth surfaces will not happen even if the range of speed ratio between side gears is increased to 1:1.85. Because of the increment in speed ratio range, the height of potential barrier to the differential rotation is enhanced; meanwhile the range of the angle of rotation of the pinions corresponding to larger torque bias ratio is enlarged, the width of the potential barrier is also enlarged, which reduces the possibility of the pinions drive over the potential barrier caused by occasional vibration, and the reliability of anti-slip is improved. In this way, the torque bias ratio of the differential is substantially increased.

DETAILED DESCRIPTION OF PREFERRED EMBODIMENTS

A further detailed description of present invention is given as follows in combination with embodiments and drawings:

Embodiment 1

Figure 1:
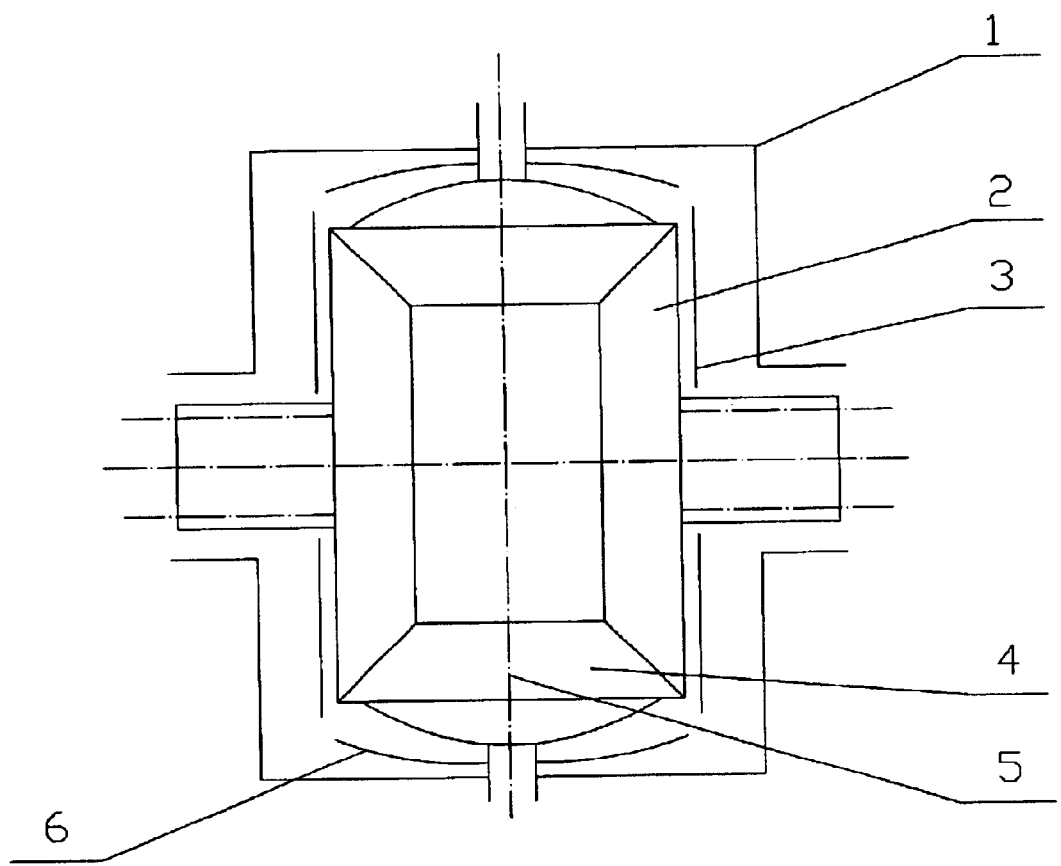
FIG. 1 is a schematic section view of the differential according to present invention.
Figure 2:
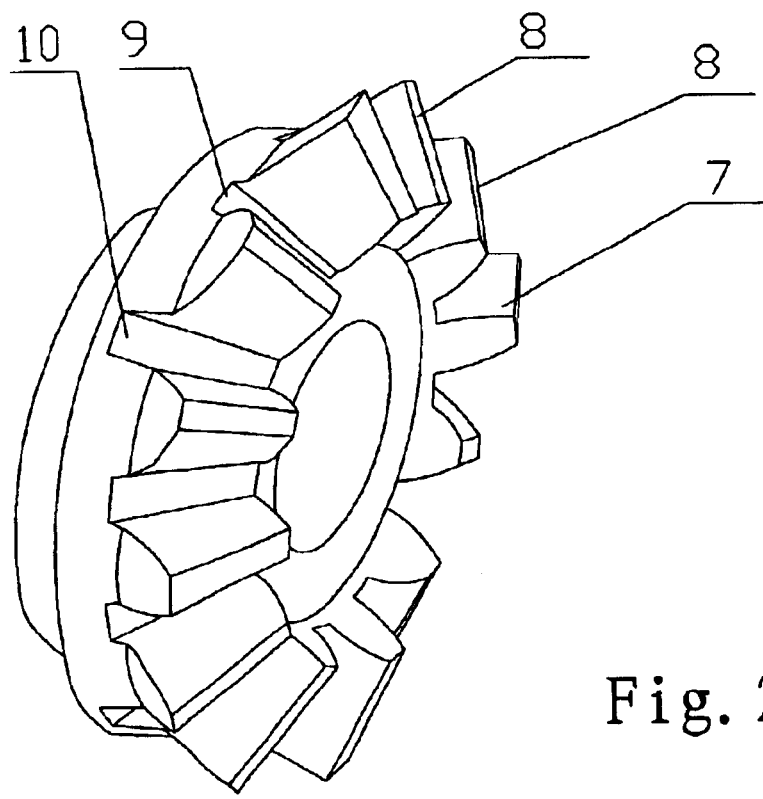
FIG. 2 is the drawing to show the structure of the side gear of the present inventions.
Figure 3:
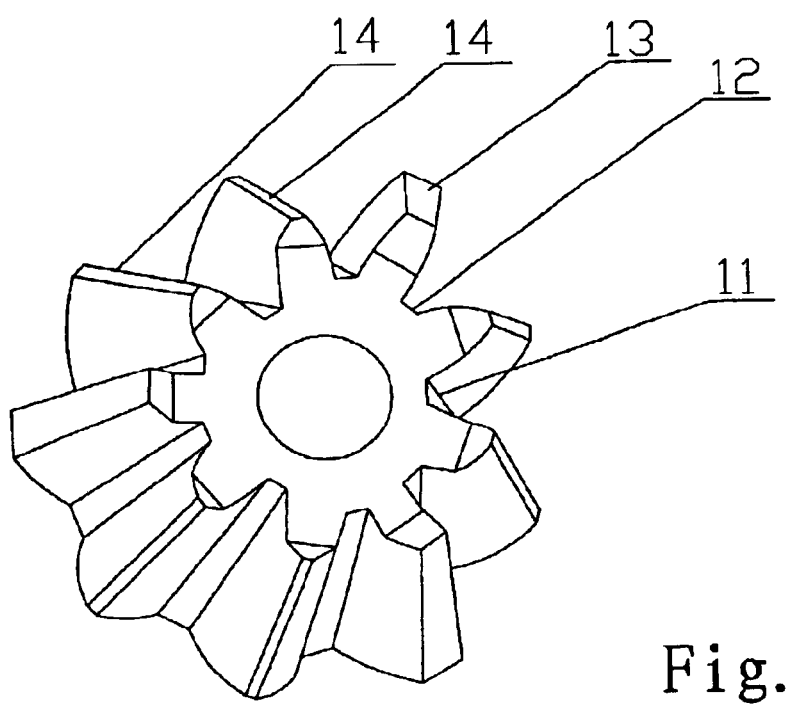
FIG. 3 is the drawing to show the structure of the pinion of the present inventions.

The structure of the embodiment is illustrated in FIGS. 1, 2 and 3. The fluctuating gear-ratio differential according to the present inventions involves a differential case 1, a pinion shaft 5, either a cross or straight shaft, fixed inside the differential case 1, the pinion gears 4 and a pair of side gears 2, spherical thrust washers 6 situated between the back sides of the pinion gears 4 and the differential case 1, flat thrust washers 3 situated between the back sides of the side gears 2 and the differential case 1, said pinion gears 4 and side gears 2 compose plural gear pairs.

For Embodiment 1, the number of teeth in both pinion gears 4 and side gears 2 are chosen to be multiples of 3, during the engagement, the speed ratio fluctuates with a period of three pitches, thus in each period of the fluctuation in speed ratio, a group of three adjacent pairs of teeth are involved, each of them has individual profile. Within a group of three teeth, each one has its individual working range, therefore the tooth height changes within the group, and each one has its individual profile.

For the same gear, the corresponding teeth in each group have the same profile and tooth height. The pinion gears 4 have an odd tooth groups, thus when the gear ratio between the pinion gears 4 and one side gear 2 reaches the maximum, the gear ratio between the pinion gears 4 and the other side gear 2 gets the minimum, in this way a maximum torque bias ratio between two side gears can be obtained. The number of tooth groups in side gears 2 is a multiple of the number of pinion gears 4, so that each pinion gears 4 works at the same phase angle, thus the kinematical interference between the pinion gears 4 and side gears 2 is avoided.

For Embodiment 1, the range of the number of teeth in side gears 2 is 9, 12, 15 and 18; while the range of the number of teeth in pinions 4 is 9 and 15. The three teeth involved in a group are successively a lower tooth, a higher tooth and another lower tooth of the same height of the lower one. For side gears 2, between a higher tooth 7 and a lower tooth 8 is a shallower tooth groove 9, and between two lower teeth 8 is a deeper tooth groove 10. For pinion gears 4, between a higher tooth 13 and a lower tooth 14 is a shallower tooth groove 12, and between two lower teeth 14 is a deeper tooth groove 11.

The working principle of Embodiment 1 is that the period of gear ratio fluctuation is increased to three pitches, so that the times of the change of gear ratio in one revolution of the pinion is reduced to one third in comparison with traditional design method, thus the speed ratio fluctuating range can be substantially increased while the relative angular acceleration between the pinions and side gears can be reduced at the same time.

The gear ratio fluctuates in a function as follows:

$$\frac{d\phi^{(1)}}{d\phi^{(2)}} = \frac{z_2}{z_1}[1 - C \cdot \text{rat} \cdot \sin(z_2 \phi^{(2)}/3) + C \cdot (1 - \text{rat}) \cdot \sin(z_2 \cdot \phi^{(2)})]$$

where $\phi^{(1)}$ represents the angle of rotation of the side gear, while $\phi^{(2)}$ indicates the angle of rotation of the pinions. For preferred embodiments, the codomain of C is 0.2 to 0.4; while the codomain of rat is 0.7 to 1.0, and the speed ratio between two side gears fluctuates within 0.5 to 2.0.

The profile design is based upon the given transmission ratio of the gear pair. Having given the profiles of one member of the gear pair, the profiles of the other member can be determined point by point according to the theorem of engagement that the relative speed between the tooth surfaces is perpendicular to the normal of the given profile at the point. During the design process, it should be ensured that all profiles are convex curves, each tooth has a suitable top land width and root width, and there exists a suitable overlap between adjacent tooth pairs. The design method for present invention is described as follows: the lower part of the profile, i.e. beneath the pitch line is a simple analytic curve, which is a combination of straight line, circular and elliptical arcs, while the upper part, i.e. above the pitch line is a conjugate profile of the analytic curve profile of the tooth that match with, which is determined point by point based on the theorem of engagement that the relative speed between the tooth surfaces is perpendicular to the normal of the analytic tooth profile at the point.

Some parameters and experimental results of the samples for Embodiment 1 are listed as follows:

| Embodiment example | $z_1$ | $z_2$ | C | rat | Speed ratio between range side gear | Torque bias ratio |
|---|---|---|---|---|---|---|
| 1 | 12 | 9 | 0.3–0.32 | 0.9–0.92 | 0.515–1.941 | 4.5–6.9 |
| 2 | 12 | 9 | 0.28–0.3 | 0.86–0.88 | 0.538–1.857 | 3.5–4.7 |
| 3 | 18 | 15 | 0.18–0.2 | 0.93–0.95 | 0.667–1.500 | 2.7–3.0 |

The parameters and experimental results listed above are used to demonstrate the invention, not used as a limitation to the invention.

By means of reasonable choice the number of teeth in both pinion and side gears to get a common factor 3 in Embodiment 1, the period of the speed ratio is designed to be 3 pitches.

For present embodiment, the periodic fluctuation in the speed ratio between two side gears are utilized to form potential barriers to the differential rotation, only when the difference in the torque applied to two side gears is larger than the sum of potential barrier to the differential rotation and friction moment torque, can the differential gears drive over the potential barrier to make continuous differential rotation, otherwise the differential gears can only swing within a period of speed ratio, i.e. three pitches.

Embodiment 2

Figure 4:
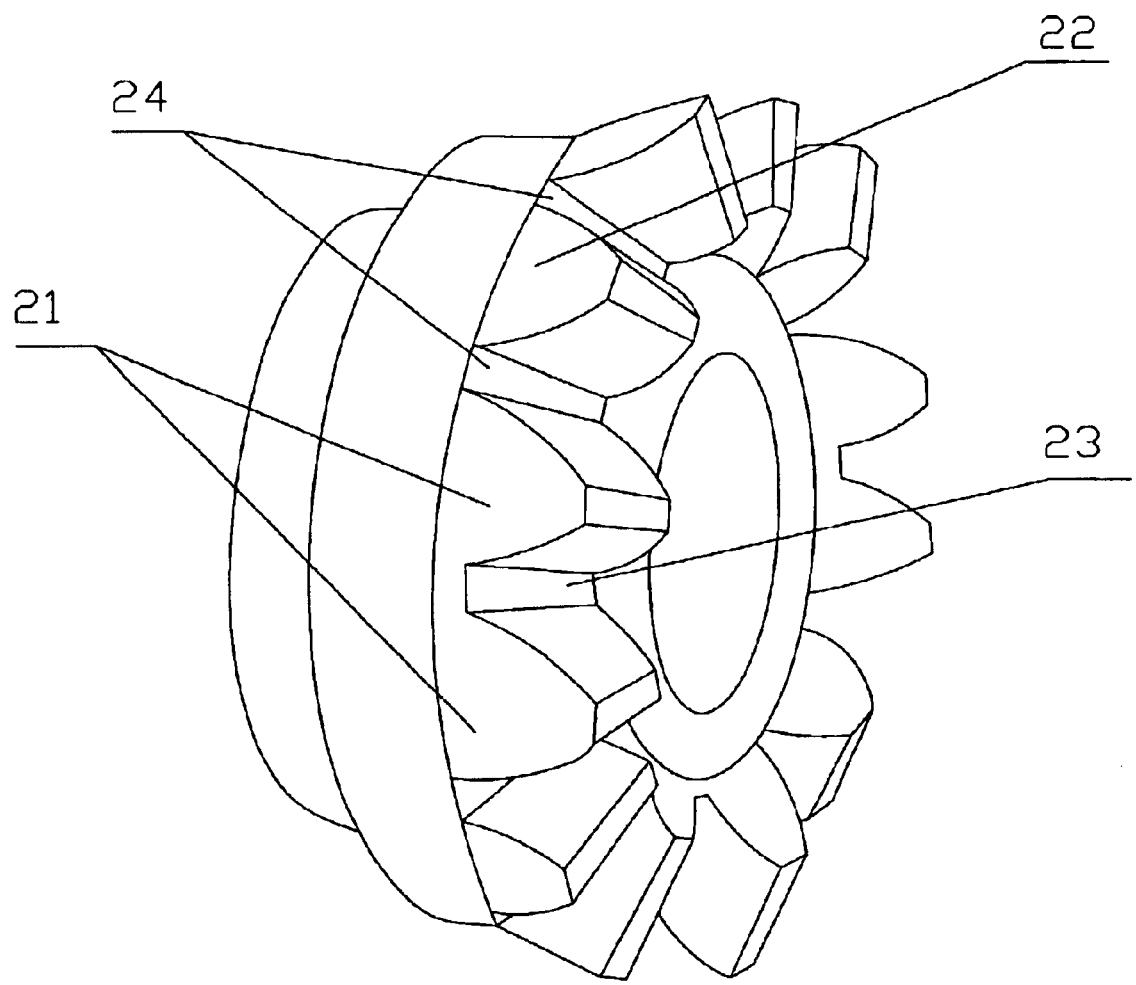
FIG. 4 is the drawing to show the structure of the side gear in another embodiment of the present inventions.
Figure 5:
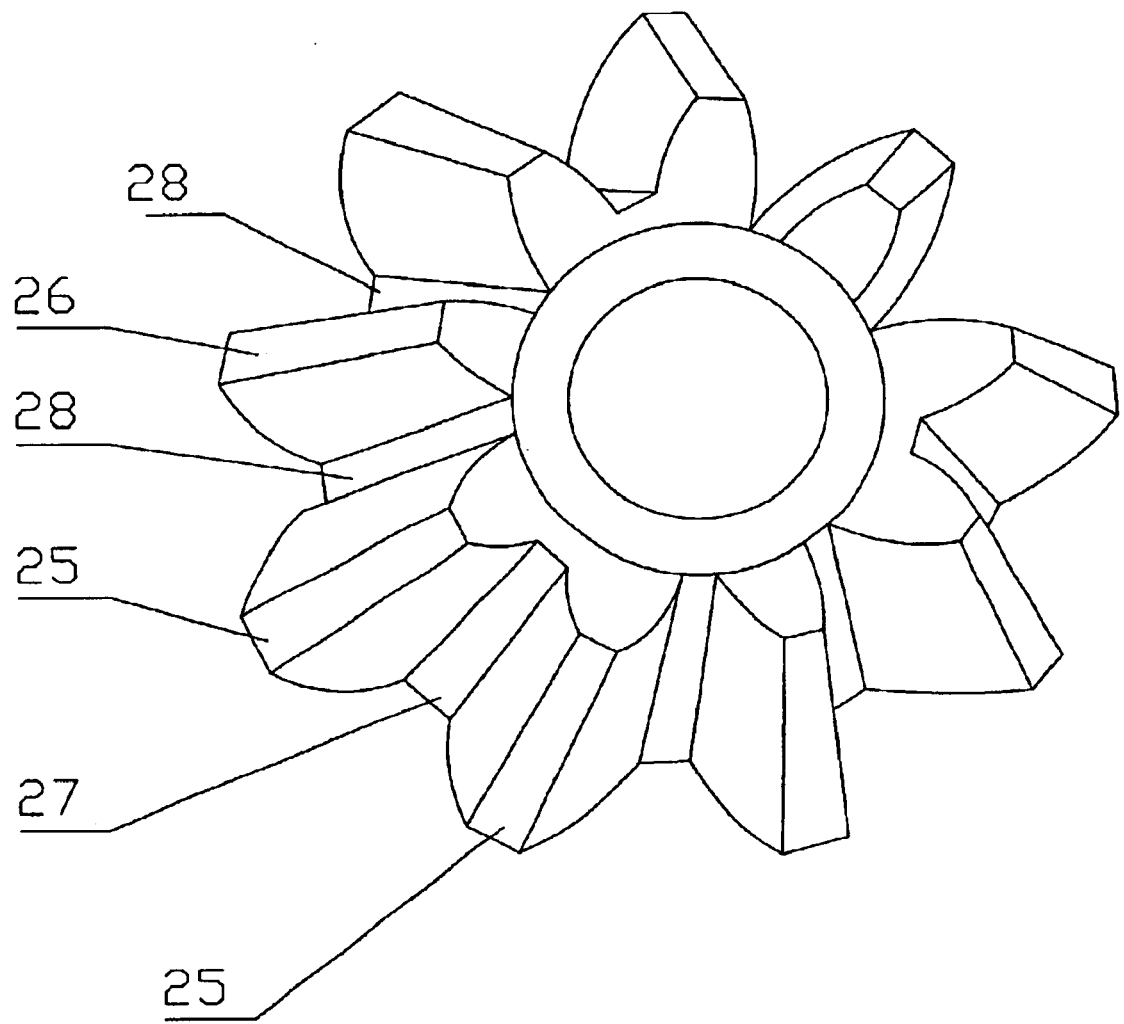
FIG. 5 is the drawing to show the structure of the pinion in another embodiment of the present inventions.

FIGS. 1, 4 and 5 illustrate Embodiment 2 in accordance with the present invention.

The structure, working principle and result of this embodiment are just the same to those of Embodiment 1, being not described here again.

The structure of the embodiment is illustrated in FIGS. 1, 4 and 5. The fluctuating gear-ratio differential according to the present inventions involves a differential case 1, a pinion shaft 5, either a cross or straight shaft, fixed inside the differential case 1, the pinion gears 4 and a pair of side gears 2, spherical thrust washers 6 situated between the back sides of the pinion gears 4 and the differential case 1, flat thrust washers 3 situated between the back sides of the side gears 2 and the differential case 1, said pinion gears 4 and side gears 2 compose plural gear pairs.

For Embodiment 2, the number of teeth in both pinion gears 4 and side gears 2 are chosen to be multiples of 3, during the engagement, the speed ratio fluctuates with a period of three pitches, thus in each period of the fluctuation in speed ratio, a group of three adjacent tooth pairs are involved, each of them has individual profile. Within a group of three teeth, each one has its individual working range, therefore each tooth within the group has its individual profile and height. For the same gear, the corresponding teeth in each group have the same profile and tooth height. The pinion gears have an odd tooth groups, and the number of tooth groups in side gears is a multiple of the number of pinion gears.

The difference between the present embodiment and the former one is that the said three teeth involved in a group are successively a higher tooth, a lower tooth and anther higher tooth of the same height of the said higher one. For side gears 2, between a higher tooth 21 and a lower tooth 22 is a deeper tooth groove 24, and between two higher teeth 21 is a shallower tooth groove 23. For pinion gears 4, between a higher tooth 25 and a lower tooth 26 is a deeper tooth groove 28, and between two higher teeth 25 is a shallower tooth groove 27.

The working principle of the present embodiment is just the same of the above one, by means of increasing the period of speed ratio to three pitches, the times of the change in speed ratio involved in one revolution of the pinion gears 4 is reduced to one third of traditional design method, thus the changing range in speed ratio can be substantially enhanced while the relative angular acceleration between the pinion gears 4 and side gears 2 is greatly reduced.

The principle and design method for Embodiment 2 are just the same of Embodiment 1, being not described again.

The above figures and descriptions of Embodiment 2 are used to demonstrate the invention, not used as a limitation to the invention.

What is claimed is:

1. A fluctuating gear ratio limited-slip differential assembly comprising:
   a differential case driven by an input shaft and adapted to allow differential rotational speed between a pair of side gears situated within said differential case;
   a pinion shaft fixed within said differential case; and
   plural pinions supported by said pinion shaft engaged with said side gears, wherein
   the gear ratio between said pinions and said side gears fluctuates during the engagement process,
   said gear ratio fluctuates with a period of at least two pitches, and the number of said pitches involved in each said period is corresponding to the common factor in the number of teeth in said pinion and said side gears, whereby each said period of gear ratio involves a group of teeth, and the number of teeth involved in each group are corresponding to the number of said pitches involved in each said period of gear ratio, the combined working range of the teeth involved in each said group covers the whole working range involved in a said period of gear ratio, and for each group of the same gear the corresponding teeth have the same structure, said pinion has an odd group number, so that during the engagement process, when the gear ratio between said pinions and one said side gear reaches the maximum, the gear ratio between said pinions and other said side gear reaches the minimum, and the group number in said side gears is a multiple of the number of said pinions, so that each said pinion works at the same phase angle.

2. The differential assembly according to claim 1, wherein the working range for each pair of teeth in each said group can be determined in design process, and there is a small overlap in said working range between adjacent teeth.

3. The differential assembly according to claim 1, wherein both tooth numbers of said pinion and said side gears are multiples of 3, during the process of engagement, said gear ratio fluctuates in a period of three pitches.

4. The differential assembly according to claim 3, wherein said pinion has an odd group number, so that during the engagement process, when the gear ratio between said pinions and one said side gear reaches the maximum, the gear ratio between said pinions and other said side gear reaches the minimum.

5. The differential assembly according to claim 4, wherein each said group comprises successively one lower tooth, a higher tooth and another lower tooth of the same height of said lower one; between said higher tooth and said lower tooth is a shallower tooth groove, and between two said lower teeth is a deeper tooth groove.

6. The differential assembly according to claim 4, wherein each said group comprises successively one higher tooth, a lower tooth and another higher tooth of the same height of said higher one; between said higher tooth and said lower tooth is a deeper tooth groove, and between two said higher teeth is a shallower tooth groove.

7. The differential assembly according to claim 3, wherein the group number in said side gears is a multiple of the number of said pinions, so that each said pinion works at the same phase angle.

8. The differential assembly according to claim 3, wherein each said group comprises successively one lower tooth, a higher tooth and another lower tooth of the same height of said lower one; between said higher tooth and said lower tooth is a shallower tooth groove, and between two said lower teeth is a deeper tooth groove.

9. The differential assembly according to claims 3, wherein each said group comprises successively one higher tooth, a lower tooth and another higher tooth of the same height of said higher one; between said higher tooth and said lower tooth is a deeper tooth groove, and between two said higher teeth is a shallower tooth groove.

10. The differential assembly according to claim 3, wherein said gear ratio between said side gears and said pinions is a function of the angle of rotation of said pinions as follows:

$$\frac{d\phi^{(1)}}{d\phi^{(2)}} = \frac{z_2}{z_1}[1 - C \cdot \text{rat} \cdot \sin(z_2 \phi^{(2)}/3) + C \cdot (1 - \text{rat}) \cdot \sin(z_2 \cdot \phi^{(2)})]$$

where $z_1$ denotes the number of teeth in said side gears, $z_2$ is the number of teeth in said pinions, $\phi^{(1)}$ represents the angle of rotation of said side gears, while $\phi^{(2)}$ indicates the angle of rotation of said pinions, C denotes the amplitude of the fluctuation in gear ratio, while rat is the ratio between first order harmonic component and a sum of the first and third order harmonic components of C.

11. The differential assembly according to claim 10, wherein the range of the number of teeth for said side gear $z_1$ is 9, 12, 15 and 18; and the corresponding range of the number of teeth for said pinion $z_2$ is 9 and 15.

12. The differential assembly according to claim 10, wherein the codomain of C is from 0.2 to 0.4.

13. The differential assembly according to claim 10, wherein the codomain of rat is from 0.7 to 1.0.

* * * * *